US008619077B1

(12) United States Patent
Côté et al.

(10) Patent No.: US 8,619,077 B1
(45) Date of Patent: Dec. 31, 2013

(54) EFFICIENT EXECUTION OF COLOR SPACE PROCESSING FUNCTIONS IN A GRAPHICS PROCESSING UNIT

(75) Inventors: Jean-François Côté, Boucherville (CA); Jean-Jacques Ostiguy, Montreal (CA)

(73) Assignee: Matrox Graphics Inc., Dorval, Quebec (CA)

( * ) Notice: Subject to any disclaimer, the term of this patent is extended or adjusted under 35 U.S.C. 154(b) by 1806 days.

(21) Appl. No.: 10/188,093

(22) Filed: Jul. 3, 2002

(51) Int. Cl.
*G06T 15/50* (2011.01)
*G06T 15/60* (2006.01)
*G06T 15/00* (2011.01)

(52) U.S. Cl.
USPC .......................................... 345/426; 345/419

(58) Field of Classification Search
USPC .......................................................... 345/426
See application file for complete search history.

(56) References Cited

U.S. PATENT DOCUMENTS

| | | | | | |
|---|---|---|---|---|---|
| 5,710,577 | A | * | 1/1998 | Laumeyer | 345/548 |
| 5,784,062 | A | * | 7/1998 | Adachi et al. | 345/418 |
| 6,031,628 | A | * | 2/2000 | Jacob et al. | 358/1.9 |
| 6,111,584 | A | * | 8/2000 | Murphy | 345/582 |
| 6,763,176 | B1 | * | 7/2004 | Trottier et al. | 386/52 |
| 6,914,638 | B2 | * | 7/2005 | Tsui | 348/663 |
| 2002/0003541 | A1 | * | 1/2002 | Boyd et al. | 345/501 |

OTHER PUBLICATIONS

Introduction to Shader Programming. Wolfgang F. Engel. Jun. 8, 2002. http://www.shaderx.com/direct3d.net/tutorials/shader/shader3.html.*
Computer Graphics: Principles and Practice. Foley et al. Addison-Wesley. 1997. p. 166-170.*
Pixel and Vertex Shaders. Hank. Jan. 23, 2002. http://hankfiles.pcvsconsole.com/answer.php?file=307.*
Secure Media Path Methods, Systems, and Architectures. Pub. No. US 2003/0236978 A1. Evans et al. Dec. 25, 2003.*
Foley et al. Computer Graphics: Principles and Practice. Addison-Wesley Publishing Company, Inc. 1997. p. 589-590.*
Russ, John C. The Image Processing Handbook. CRC Press LLC. 2002. p. 40-46.*
Foley et al. Computer Graphics: Principles and Practice. Addison-Wesley Publishing Company, Inc. 1997. p. 166-170, 873-876, 886-890.*
Foley et al. Computer Graphics: Principles and Practice. Addison-Wesley Publishing Company, Inc. 1997. p. 866-871.*

(Continued)

*Primary Examiner* — Kee M Tung
*Assistant Examiner* — Yi Wang
(74) *Attorney, Agent, or Firm* — Norton Rose Fulbright Canada LLP

(57) ABSTRACT

A pixel shader program for execution by a processing unit in a graphics processing module is designed to execute a color space processing function on individual pixels of a video image. The color space processing function is broken down into series of steps, each of which is amenable to representation by an individual instruction taken from an instruction set. The instructions cause the processor to load pixel color data into first memory elements, to read the first memory elements as well as second memory elements containing pre-loaded parameters representative of the color space processing function and to generate a processed set of color data for each pixel by manipulating the first and second memory elements. In this way, color space processing functionality, such as color space conversion and procamp controls, is provided without the need for specialized hardware and without encroaching upon the computational efficiency of the host CPU.

24 Claims, 3 Drawing Sheets

(56) References Cited

OTHER PUBLICATIONS

Abrash. Inside Xbox Graphics. Aug. 1, 2000. http://www.ddj.com/184404199.*

Dietrich. DX8 Pixel Shader Detail. NVIDIA Technical Presentation. Nov. 10, 2000. http://developer.nvidia.com/object/advanced_dx8_pixel_shaders.html.*

Lastra et al. Real-Time Programmable Shading. Proceedings of the 1995 Symposium on Interactive 3D Graphics. 1995.*

Hardware Technology SMARTSHADER TM Technology White Paper, downloaded from http://www.ati.com/na/pages/technology/hardware/smartshader/smartshader_white_paper.html on Feb. 27, 2002.

* cited by examiner

EFFICIENT EXECUTION OF COLOR SPACE PROCESSING FUNCTIONS IN A GRAPHICS PROCESSING UNIT

FIELD OF THE INVENTION

The present invention relates generally to processing of a video data stream and, in particular, to the execution of color space processing functions in a graphics processing unit.

BACKGROUND OF THE INVENTION

The representation of three-dimensional (3D) graphics on a two-dimensional (2D) display involves numerous steps that are performed one after the other in pipelined fashion. With reference to FIG. 1A, there is shown a typical 3D graphics drawing pipeline including various processing modules.

At the outset, an artist creates a set of 3D models, which are represented using a series of primitives represented by interconnected points known as vertices. The primitives and their vertices are stored in display lists 106 where each vertex contains several pieces of information about itself, such as its position, color, texture, reflectivity, etc. Once a software application determines what objects will be present in the 3D scene being drawn and how they are arranged, the appropriate display list 106 is sent to the geometry processing module 102.

The geometry processing module 102 performs calculations that modify and, in some cases, create new data for vertices. These operations are executed by graphics hardware typically embodied as a special-purpose graphics processing unit (GPU) which is in communication with a host central processing unit (CPU). Alternatively, if these operations are not supported by the graphics hardware, they can be executed in the host CPU, but this almost always results in greatly reduced performance. Once the vertex data has been processed by the geometry processing module 102, the processed primitives with their vertices are then passed on to a rendering stage 104A for conversion into pixels.

Thus, the objective of the rendering stage 104A is to convert three-dimensional primitives (processed by the geometry processing module 102) into two-dimensional picture element (pixel) data. This is accomplished by passing the vertices of each primitive through a setup module 112, which links the vertices together to form triangles. The triangle information is then provided to a pixel shader module 116A, whose role it is to "fill" each pixel with the appropriate color. Those skilled in the art will appreciate that the color of each pixel has to be chosen carefully in order to give the 2D image the appearance of depth and texture.

The pixel shader module 116A runs a pixel shader program which is executed on individual pixels as they pass through the rendering stage 104A of the 3D graphics pipeline. The pixel shader module 116A computes a final shade for each pixel by processing the triangles that influence that pixel. Furthermore, in order to apply the correct texture information (e.g., reflectivity, transparency, etc.) to each pixel, the pixel shader module 116A interacts with a texture processing module 130A, which accesses a texture memory 128.

It should be noted that the color information provided to the pixel shader module 116A can be represented in a variety of formats. In some cases, the color information of a particular triangle could be provided as a color space vector of three coefficients in a red-green-blue (RGB) color space. In other cases, the color space vector may consist of three coefficients in a luminance-chrominance (YCbCr, or YUV) color space. Since some functions of the texture processing module 130A are better suited for execution in one color space rather than another, it may be necessary to convert a given color space vector into a different color space prior to texture processing.

To this end, the texture processing module 130A will typically interact with a color space conversion (CSC) module 110 prior to causing the execution of the pixel shader code by the pixel shader module 116A. The operations performed by the color space conversion module 110 conventionally involve the use of specialized logic gates for performing the mathematical expressions relating to color space conversion.

After completion of processing by the pixel shader module 116A, the processed pixels are provided to a blending module 118 at the end of the rendering stage 104A. Once the blending module 118 has completed its processing, the final colors of each pixel in the rendered image are written to a block of memory called the frame buffer 124. From this point, the image can either be sent back through the pipeline again for further processing (e.g., by the blending module 118), or sent to a display processing module 140A for further processing.

The display processing module 140A has the ability to read the frame buffer 124 and to provide the data contained therein to a display 142 for the purposes of displaying the data (e.g., on a screen). Depending on the data format accepted by the display type (e.g., RGB or YUV) and depending on the color space in which the data is stored in the frame buffer 124, the display processing module 140A may be required to access an additional color space conversion module 122. As with the color space conversion module 110, the color space conversion module 122 typically involves the use of specialized logic gates for performing the mathematical expressions relating to color space conversion.

It may also be desirable to change certain key parameters of a video data stream, such as color saturation, hue, brightness and/or to provide definition control (contrast). These functions are collectively referred to as video processing amplifier controls, or "procamp" controls, in analogy to the well known video processing amplifiers that operate on analog video signals. To this end, the texture processing module 130A may communicate with a procamp module 144 in order to perform procamp controls prior to causing the execution of the pixel shader code by the pixel shader module 116A, while the display processing module 140A may communicate with a procamp module 146 prior to displaying the pixels on the display 142. The procamp modules 144, 146 usually involve the use of specialized logic circuits for performing the mathematical expressions relating to the procamp controls.

As is known to those of ordinary skill in the art, the specialized logic circuits used in performing color space conversion and procamp controls functionality are typically implemented as ASICs (application-specific integrated circuits), PLAs (programmable logic arrays) or FPGAs (field-programmable gate arrays) adapted to execute millions of arithmetic operations (sums and products) per second. Consequently, these dedicated hardware elements occupy a relatively large semiconductor area, which consumes chip real estate that would otherwise be available to the GPU.

It should thus be apparent from the foregoing that the processing power of a GPU, which is responsible for performing numerous steps in the 3D graphics pipeline, is eroded by performing color space processing using specialized logic circuits. Accordingly, it would be desirable to provide the functionality of the color space processing modules 110, 122 and the procamp modules 144, 146 in a GPU without having recourse to the use of additional co-processing hardware.

SUMMARY OF THE INVENTION

The functionality of a conventional pixel shader module is enhanced to include color space processing functions. This allows the elimination of specialized logic circuits and other hardware associated with conventional color space conversion modules and procamp modules. This, in turn, leads to more efficient utilization of chip real estate.

Therefore, according to a first broad aspect, the invention provides computer-readable media tangibly embodying a pixel shader program for execution by a processing unit adapted to process individual pixels of a video image, each pixel being associated with a set of color coefficients. The computer-readable media include computer readable program code for instructing the processing unit to load the set of color coefficients associated with each pixel into a set of first memory elements; and computer readable program code for instructing the processing unit to generate a processed set of color coefficients associated with each pixel by manipulating the set of first memory elements and a set of second memory elements, wherein the second memory elements contain pre-loaded parameters representative of a color space processing function.

According to a second broad aspect, the present invention provides a pixel shader module for performing a color space processing function on individual pixels of a video image, each pixel being associated with a set of color coefficients. The pixel shader module includes a processor-readable code memory for storing processor instructions; a plurality of first memory elements containing pre-loaded parameters representative of a color space processing function; a plurality of second memory elements; and a processor connected to the first and second memory elements and to the code memory, the processor being adapted to read the code memory and execute the processor instructions stored therein. The processor instructions include instructions for causing the processor to load the set of color coefficients of each pixel into the second memory elements; and instructions for causing the processor to generate a processed set of color coefficients for each pixel by manipulating the first and second memory elements.

According to a third broad aspect, the present invention can be summarized as the use of a pixel shader module for implementing a method of performing a color space processing function on sets of color coefficients respectively associated with pixels of a video image. The method includes loading the set of color coefficients associated with a first pixel into first memory elements; reading the first memory elements and a plurality of second memory elements containing pre-loaded parameters representative of the color space processing function; and manipulating the first and second memory elements in accordance with the color space processing function to generate a new set of color coefficients associated with the first pixel.

According to a fourth broad aspect, the present invention can be summarized as the use of a pixel shader module for performing a color space processing function.

According to a fifth broad aspect, the present invention provides a method of modifying a pixel shader program defined by a series of instructions for causing a processor to execute a pixel shading function on sets of color coefficients respectively associated with pixels of a video image. The method includes retaining instructions for causing the processor to load the set of color coefficients associated with each pixel into a set of first memory elements; and providing additional instructions for causing the processor to generate a processed set of color coefficients associated with each pixel by manipulating the set of first memory elements and a set of second memory elements, wherein the second memory elements contain pre-loaded parameters representative of a color space processing function.

According to a sixth broad aspect, the present invention provides a method of performing color space processing on an original set of color coefficients, including providing a pixel shader program with the original set of coefficients and a set of parameters representative of a desired color space processing function; waiting for the pixel shader program to execute the desired color space processing function on the original set of color coefficients; and obtaining from the pixel shader program a processed set of color coefficients representative of the desired color space processing function having been performed on the original set of color coefficients.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1A:
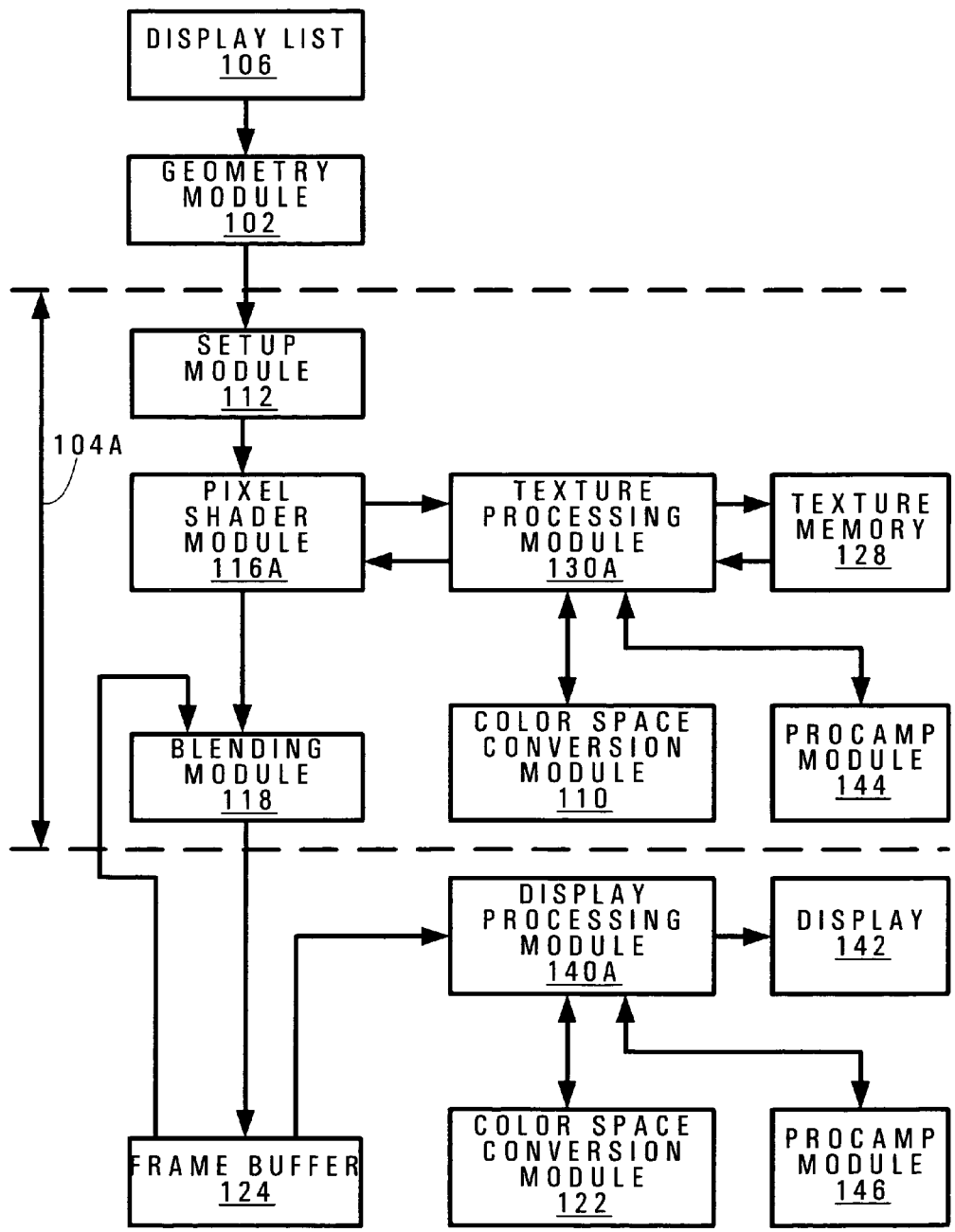
FIG. 1A shows various modules involved in the conventional processing of primitives for representation of 3D graphics on a 2D display.
Figure 1B:
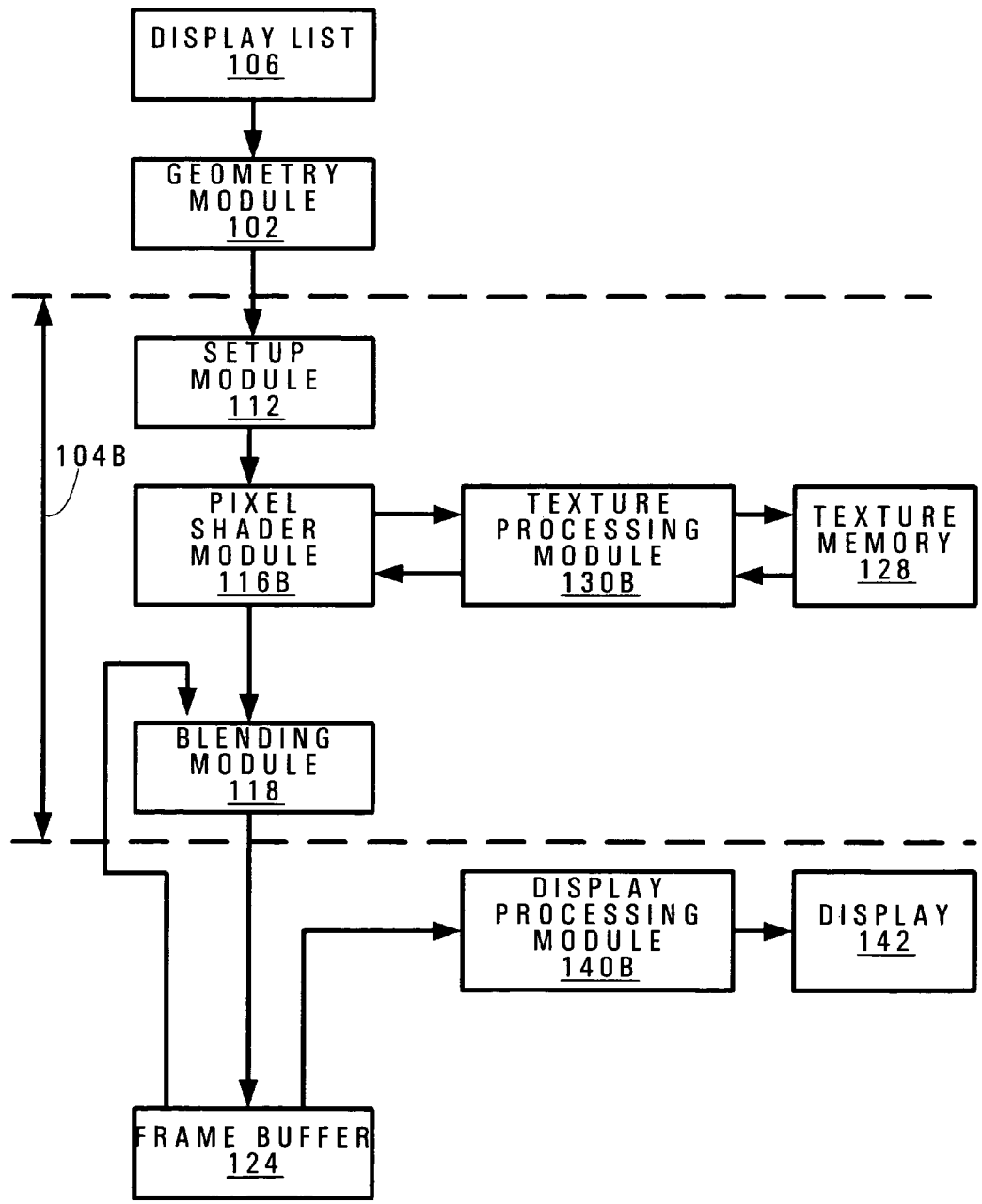
FIG. 1B shows various modules, including a pixel shader module, involved in processing primitives in accordance with an embodiment of the present invention.

With reference to FIG. 1B, there will now be described a graphics processing pipeline in accordance with an embodiment of the present invention. Specifically, the display list 106 is sent to the geometry processing module 102 and, as was the case with FIG. 1A, the geometry processing module 102 performs calculations that modify and, in some cases, create new data for vertices. Once the vertices in the display list 106 have been processed by the geometry processing module 102, the processed primitives with their vertices are then passed on to a rendering stage 104B for conversion into pixels.

As before, the objective of the rendering stage 104B is to convert three-dimensional primitives (processed by the geometry processing module 102) into two-dimensional picture element (pixel) data. This is accomplished by passing the vertices of each primitive through the setup module 112, which links the vertices together to form triangles. The triangle information is then provided to a pixel shader module 116B that has been designed in accordance with an embodiment of the present invention. The role of the pixel shader module 166B is to "fill" each pixel with the appropriate color. However, the pixel shader module 116B is designed differently from the pixel shader module 116A.

Figure 2:
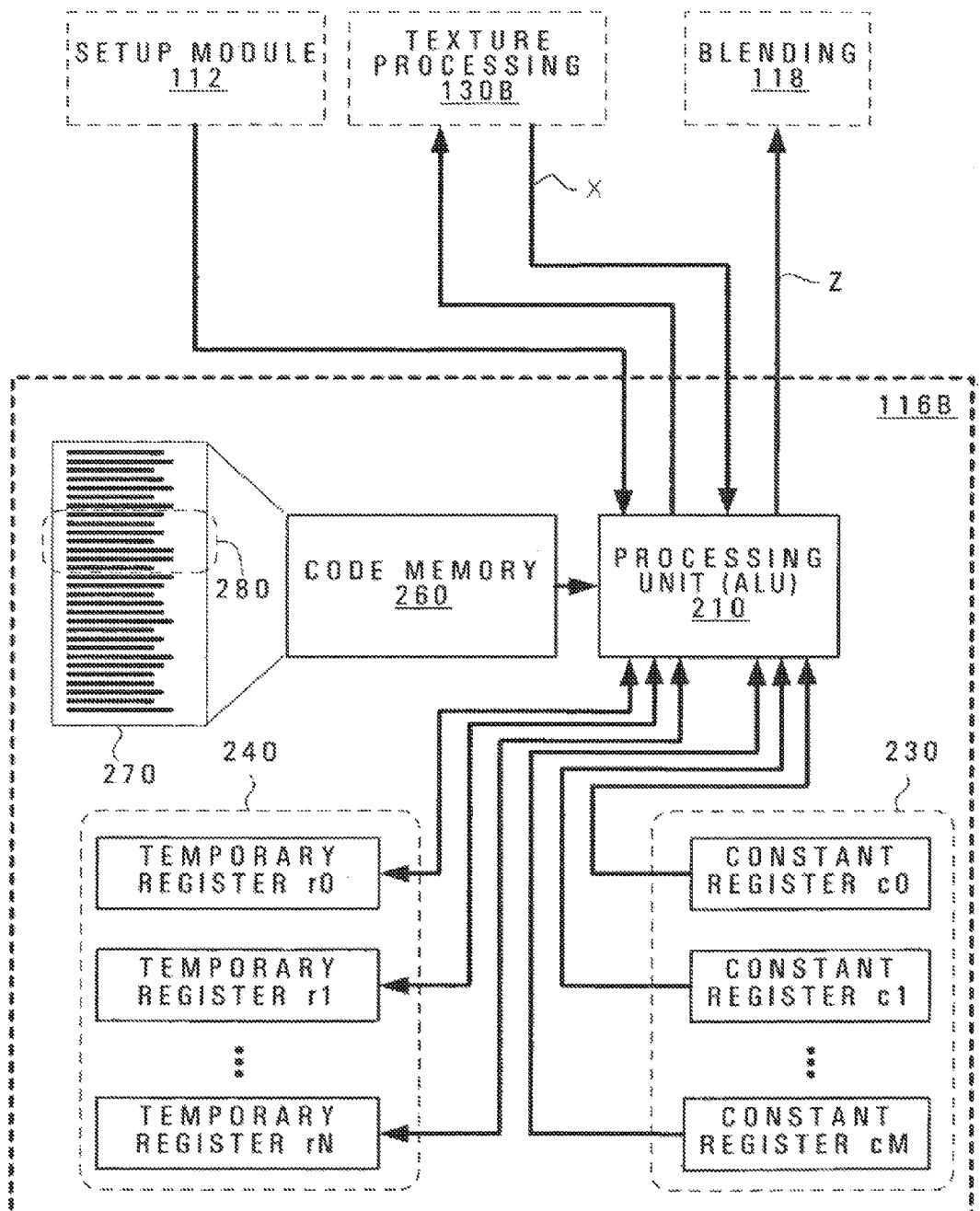
FIG. 2 shows, in block diagram form, various parts of the pixel shader module of FIG. 1B, in accordance with an embodiment of the present invention.

Referring now to FIG. 2, there is shown a pixel shader module 116B in accordance with an embodiment of the present invention, including a processing unit 210 (e.g., an arithmetic and logic unit—ALU) with access to M constant value registers 230 and N temporary data registers 240. Each register holds at least one coefficient but is preferably of sufficiently size as to hold a vector having multiple (e.g., two, three or more) coefficients. The processing unit 210 further has access to a code memory 260 which stores a pixel shader program 270 defining operation of the processing unit 210.

The pixel shader program 270 includes multiple lines of computer readable program code (i.e., instructions) defining various routines, functions and so on.

The pixel shader program 270 can be loaded into the code memory 260 as render state between primitives or it can be loaded by setting the program counter to a special value which will cause the sequencer to automatically fetch the code. The constant registers 230, which store parameters for the execution of color space processing functions, can also be loaded as render state between primitives.

The processing unit 210 executes the instructions in the pixel shader program 270 stored in the code memory 260. During execution of the pixel shader program 270, the processing unit 210 receives data from the setup module 112, interacts with the texture processing module 130B in order to obtain the color space vector "X" corresponding to the current pixel, and sends processed data to the blending module 118. During this time, the processing unit 210 reads the constant value registers 230 and both reads from and writes to the temporary data registers 240.

The order in which the processing unit 210 reads to and writes from the registers 230, 240, as well as the exact identity of the registers used, is determined by the series of instructions that define the pixel shader program 270. Upon completion of execution of the pixel shader program 270, the result will be a processed color space vector "Z", which may be stored in a predefined location, e.g., in one of the temporary data 240 registers. This processed color space vector may then be sent to the blending module 118 or may undergo further processing by the processing unit 210.

In accordance with an embodiment of the present invention, the pixel shader program 270 includes a routine 280 that performs a color space processing function, such as color space conversion and/or procamp controls. The routine 280, which may be referred to as a color space processing function (CSPF) routine, is a subset of the instructions which make up the pixel shader program 270 and as such includes a function, routine, sub-routine or other similarly defined portion of the pixel shader program 270. Therefore, depending on the format of the color information required by the texture processing module 130B, the CSPF routine 280 of the pixel shader program 270 can provide the appropriate color space conversion which was previously provided by the specialized logic gates of the color space conversion module 110.

The CSPF routine 280 of the pixel shader program 270 can also apply changes to the color saturation, hue, brightness and/or to provide definition control (contrast) of each pixel, thus eliminating the previous need for a dedicated procamp module 144. (It should be noted that the CSPF routine 280 of the pixel shader program 270 can also perform, at this stage, any color space processing that will be required prior to displaying the pixels on the display 142. This allows elimination of the color space module 122 and procamp module 146 of FIG. 1.)

Once the blending module 118 has completed its processing, the final colors of each pixel in the rendered image are written to the frame buffer 124. In the usual manner, the display processing module 140B reads the frame buffer 124 and provides the data contained therein to the display 142. Advantageously, however, the display processing module 140B does not need to access any separate color space conversion module or procamp module prior to displaying the data read from the frame buffer 124. This is because the pixels are provided in the appropriate format for display, and with the appropriate procamp parameters, by virtue of performing color space processing functions in the pixel shader module 116B.

Thus, it should be apparent that by enhancing the functionality of the pixel shader module 116B, it is possible to eliminate the color space conversion module 110, the color space conversion module 122, the procamp module 144 and the procamp module 146 including all of the associated hardware (specialized logic gates). This allows the processing unit 210 and the processing units associated with other modules of the graphics processing unit to occupy greater chip area, which was previously taken up by modules 110, 122, 144 and 146.

Those skilled in the art will understand more fully the operations performed by the CSPF routine 280 of the pixel shader program 270 in executing color space processing functions upon consideration of the following mathematical treatment of color space conversion and procamp controls.

In general, color space conversion can be thought of as an affine transformation between Y, Cb and Cr values on the one hand and R, G and B values on the other. The exact values of the transformation parameters depend on the colorimetry standard being employed. For instance, SMPTE 170 and SMPTE 274 are two colorimetry standards that are widely used in television. The SMPTE 170 standard is used in analog television (SMPTE 170M-1994 Television Composite Analog Video Signal—NTSC for Studio Applications) while the SMPTE 274 standard is used in digital television (SMPTE 274M-1995 Television—1920×1080 Scanning and Interface).

Thus, letting [R G B] represent the color space vector in RGB space and letting [Y Cb Cr] represent the color space vector in YCbCr space, one can define YCbCr-to-RGB color space conversion as follows:

$$[RGB] = ([YCbCr] - [K]) * [SMPTE\_YUV]$$

where $$[SMPTE\_YUV] = [+1.164 \quad +1.164 \quad +1.164]$$
$$[+0.000 \quad -0.392 \quad +2.017]$$
$$[+1.596 \quad -0.813 \quad +0.000]$$

and $$[K] = [16 \; 128 \; 128].$$

Note that [K] is used to adjust the range of the vector to be transformed, since each of the Y, Cb and Cr values and each of the R, G and B values must belong to a specific range in order to be valid.

Expanding the above, one has:

$$[RGB] = [YCbCr] * [SMPTE\_YUV] + (-[K] * [SMPTE\_YUV])$$

Thus, it can be seen that the transformation can be represented as follows:

$$[RGB] = [YCbCr] * [A] + [b]$$

where $$[A] = [SMPTE\_YUV]$$

and $$[b] = -[K] * [SMPTE\_YUV].$$

A similar transformation can be effected in the opposite direction, i.e., from RGB color space to YCbCr color space, which uses the following transformation matrix rather than the [SMPTE_YUV] matrix:

$$[SMPTE\_RGB] = \begin{bmatrix} +0.257 & -0.148 & +0.439 \\ +0.504 & -0.291 & -0.368 \\ +0.098 & +0.439 & -0.071 \end{bmatrix}.$$

Again, it should be mentioned that each of the Y, Cb and Cr values and each of the R, G and B values must belong to a specific range in order to be valid. Since it is possible that the transformation from the RGB space to the YCbCr color space (or vice versa) will yield some invalid values, a limiting step may need to be performed on the result of the transformation.

Having regard to procamp controls, it is recalled that these include brightness, contrast, saturation and hue. By way of example, a standard equation for contrast and brightness control can be defined on a YCbCr color space vector as $$[YCbCr]' = ([YCbCr] - [K])*[CONTRAST]*[HUE]* \\ [SAT] + [BRIGHT] + [K]$$

where $$[BRIGHT] = [b \quad 0 \quad 0]$$

$$[CONTRAST] = \begin{bmatrix} c & 0 & 0 \\ 0 & 1 & 0 \\ 0 & 0 & 1 \end{bmatrix}$$

$$[SAT] = \begin{bmatrix} 1 & 0 & 0 \\ 0 & s & 0 \\ 0 & 0 & s \end{bmatrix}$$

$$[HUE] = \begin{bmatrix} 1 & 0 & 0 \\ 0 & \cos(h) & -\sin(h) \\ 0 & \sin(h) & \cos(h) \end{bmatrix}$$

b is a desired brightness adjustment,
c is a desired contrast adjustment,
s is a desired saturation adjustment,
h is a desired hue adjustment and $$[K] = [16 \; 128 \; 128] \text{ (as before)}.$$

Expanding the above, one has:

$$[YCbCr]' = ([YCbCr]*[CONTRAST]*[HUE]*[SAT]) - \\ ([K]*[CONTRAST]*[HUE]*[SAT]) + \\ [BRIGHT] + [K]$$

$$[YCbCr]' = [YCbCr]*([CONTRAST]*[HUE]*[SAT]) + \\ ([K]*[CONTRAST]*[HUE]*[SAT]*(-1) + \\ [BRIGHT] + [K]$$

Thus, it can be seen that the procamp controls can be represented as follows:

$$[YCbCr]' = [YCbCr]*[A] + [b]$$

where $$[A] = [CONTRAST]*[HUE]*[SAT]$$

and $$[b] = [K]*[CONTRAST]*[HUE]*[SAT]*(-1) + \\ [BRIGHT] + [K]$$

It should therefore be apparent from the foregoing that color space processing functions such as color space conversion and procamp controls can be represented using matrix algebra notation in the following way:

$$[Z] = [X]*[A] + [b], \qquad \text{(Eqn. 1)}$$

where $[X] = [x1 \; x2 \; x3]$ is an input color space vector (either in RGB or YCbCr format) to be processed, $[Z] = [z1 \; z2 \; z3]$ is the output color space vector (either in RGB or YCbCr format), $$[A] = \begin{bmatrix} a11 & a12 & a13 \\ a21 & a22 & a23 \\ a31 & a32 & a33 \end{bmatrix} \qquad \text{(Eqn. 2)}$$

is a constant matrix and $[b] = [b1 \; b2 \; b3]$ is a constant vector. Through appropriate selection of the coefficients of the constant vector [b] and the constant matrix [A], various color space processing functions can be achieved.

Examples of color space processing functions that fall into this category include YCbCr to RGB color space conversion, RGB to YCbCr color space conversion, procamp controls on a YCbCr color space vector with output in YCbCr, procamp controls on an RGB color space vector with output in YCbCr, procamp controls on a YCbCr color space vector with output in RGB and procamp controls on an RGB color space vector with output in RGB. Still other color space processing functions are possible and these may be combined with either or both of color space conversion and procamp controls. It should be expressly understood that the present invention is in no way limited to a particular pair of color spaces, to a particular color space processing function or to a particular set of values for the coefficients of the vector [b] or the matrix [A].

There are many combinations of instructions that can constitute a CSPF routine 280 of the pixel shader program 270 which causes the execution of a desired color space processing function on a color space vector. Those skilled in the art will appreciate that the myriad combinations of instructions resulting in execution of the same function are basically equivalent, with slight variations in computational efficiency and memory requirements, all such variations being within the scope of the present invention.

In one embodiment, each individual instruction belongs to a machine-level instruction set suitable for direct execution by the processing unit 210. In other cases, the instructions may be similar to assembly language instructions, which are both easy for developers to understand and sufficiently close to the machine operation to allow for efficient usage of GPU resources. Moreover, a pixel shader is also definable by expressions in a higher-level language, which could then be translated into machine readable form. Of course, different processing units may be adapted to different instruction sets and it is within the scope of the present invention to tailor the pixel shader program 270 to the processing platform of interest.

The use of an instruction set with a limited number of simple instructions allows general mathematical computations to be performed in a more efficient manner. In other words, complex equations can be broken down by storing partial results in temporary registers. It should therefore be apparent that by using the temporary data registers to store intermediate values, lengthy or complex equations, such as those involving matrix manipulation (see, e.g., Eqn. 1 above), can be evaluated more easily, i.e., in a fewer number of cycles. Given a sufficient number of temporary data registers 240, color space conversion and procamp controls functions can be executed in a convenient manner, without resorting to specialized logic circuits in the graphics processing unit and without significantly adding to the workload of the processing unit 210.

Advantageously, once a CSPF routine 280 of the pixel shader program 270 has been devised for execution of one color space processing function, it is possible to reuse a large part of the CSPF routine 280 of the pixel shader program 270 for execution of other color space processing functions. The only required change would be the initialization of the registers used to store a11, a12, a13, a21, a22, a23, a31 a32 a33, b1, b2 and b3 and the provision of an optional limiting function (used when performing color space conversion). In fact, if the aforementioned values are provided to the CSPF routine 280 in the form of arguments, then it is possible to use exactly the same CSPF routine 280 for execution of different color space processing functions, simply by calling the CSPF routine 280 of the pixel shader program 270 with a different set of arguments.

In order to facilitate the execution of color space processing functions by the processing unit 210, it may be advantageous to create new instructions to the instruction set conventionally used in a pixel shader programs. If such new instructions are needed, then these can be added to the instruction set, thereby to create an augmented instruction set. The processing unit 210 would then be modified such that it is enabled to interpret the new instructions.

On the other hand, it may be advantageous to be able to rely on the same instruction set used by the other routines of the pixel shader program 270, without creating new instructions. In this way, the hardware (i.e., processing unit 210) already in place for executing other, more conventional routines of the pixel shader program 270 can be reused to execute color space processing functions as well. This would also avoid having to train programmers to use new instructions for the execution of color space processing functions.

Those skilled in the art should also appreciate that the instructions defining a pixel shader in accordance with an embodiment of the present invention could be stored on a medium which is fixed, tangible and readable directly by the processing unit 210 (e.g., removable diskette, CD-ROM, ROM, EEPROM or fixed disk).

Alternatively, the program instructions could be stored remotely but transmittable to the processing unit 210 via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

We claim:

1. Computer-readable media tangibly embodying a pixel shader program for execution by a pixel shader module adapted to process individual pixels of a video image, each pixel being associated with a set of color coefficients in a first multi-dimensional color space, said computer-readable media comprising:

computer readable program code for instructing the pixel shader module to load the set of color coefficients associated with each pixel into a set of first memory elements, the pixel shader module being part of a rendering stage of a 3D graphics drawing pipeline, the rendering stage being where three-dimensional graphics primitives are converted into pixels, the pixel shader module operable to receive primitive information for each one of the three-dimensional graphics primitives and to compute a color for each one of the pixels using the received primitive information and texture information received from a texture processing module which is part of the rendering stage of the 3D graphics drawing pipeline;

computer readable program code for instructing the pixel shader module to generate a processed set of color coefficients associated with each pixel by manipulating the set of first memory elements and a set of second memory elements, wherein the second memory elements contain pre-loaded parameters representative of a color space processing function that is at least one of color space conversion and video processing amplifier control, and wherein said processed set of color coefficients is in a second multi-dimensional color space that is different from the first multi-dimensional color space, wherein both the first multi-dimensional color space and said second multi-dimensional color space are of the same dimension.

2. The computer-readable media defined in claim 1, further comprising:

computer readable program code for instructing the pixel shader module to load the processed set of color coefficients associated with each pixel into a set of third memory elements.

3. The computer-readable media defined in claim 1, further comprising:

computer readable program code for instructing the pixel shader module to load the processed set of color coefficients associated with each pixel into a frame buffer.

4. The computer-readable media defined in claim 1, wherein the set of color coefficients associated with each pixel prior to manipulation of the first and second memory units includes color coefficients in one of RGB color space and YUV color space.

5. The computer-readable media defined in claim 4, wherein the processed set of color coefficients associated with each pixel includes color coefficients in one of RGB color space and YUV color space.

6. The computer-readable media defined in claim 4, wherein the processed set of color coefficients associated with each pixel includes color coefficients in the other of RGB color space and YUV color space.

7. The computer-readable media defined in claim 1, wherein the video processing amplifier controls include at least one of hue, saturation, brightness and contrast controls.

8. The computer-readable media defined in claim 1, further comprising computer readable program code for instructing the pixel shader module to receive the set of color coefficients associated with each pixel from the texture processing module.

9. The computer-readable media defined in claim 1, wherein the pixel shader module is operable to receive the primitive information for each one of the three-dimensional graphics primitives from a setup module which is part of the rendering stage of the 3D graphics drawing pipeline, the setup module operable to process vertices of each one of the three-dimensional graphics primitives.

10. A pixel shader module for performing color space processing on individual pixels of a video image, each pixel being associated with a set of color coefficients in a first multi-dimensional color space, the pixel shader module comprising:

a processor-readable code memory for storing processor instructions;

a plurality of first memory elements containing pre-loaded parameters representative of a color space processing function that is at least one of color space conversion and video processing amplifier control;
a plurality of second memory elements; and
a processor connected to the first and second memory elements and to the code memory, the processor being adapted to read the code memory and execute the processor instructions stored therein;
the processor instructions including:
instructions for causing the pixel shader module to load the set of color coefficients of each pixel into the second memory elements;
instructions for causing the pixel shader module to generate a processed set of color coefficients for each pixel by manipulating the first and second memory elements, wherein said processed set of color coefficients is in a second multi-dimensional color space that is different from the first multi-dimensional color space, wherein both the first multi-dimensional color space and said second multi-dimensional color space are of the same dimension,
the pixel shader module being part of a rendering stage of a 3D graphics drawing pipeline, the rendering stage being where three-dimensional graphics primitives are converted into pixels, the pixel shader module operable to receive primitive information for each one of the three-dimensional graphics primitives and to compute a color for each one of the pixels using the received primitive information and texture information received from a texture processing module which is part of the rendering stage of the 3D graphics drawing pipeline.

11. The pixel shader module defined in claim 10, wherein the processor instructions further include instructions for causing the pixel shader module to load the output color space coefficients in to third ones of the memory elements.

12. The pixel shader module defined in claim 10, further comprising a frame buffer, wherein the processor instructions further include instructions for causing the pixel shader module to load the processed set of color coefficients for each pixel into said frame buffer.

13. The pixel shader module defined in claim 12, wherein the first memory elements are constant data registers and wherein the second memory elements are temporary value registers.

14. The pixel shader module defined in claim 10, wherein said memory elements are registers.

15. The pixel shader module defined in claim 14, wherein the first memory elements are constant data registers and wherein the second memory elements are temporary value registers.

16. The pixel shader module defined in claim 10, wherein the processor instructions further include instructions for causing the pixel shader module to receive the set of color coefficients of each pixel from the texture processing module.

17. The pixel shader module defined in claim 10, wherein the pixel shader module is operable to receive the primitive information for each one of the three-dimensional graphics primitives from a setup module which is part of the rendering stage of the 3D graphics drawing pipeline, the setup module operable to process vertices of each one of the three-dimensional graphics primitives.

18. A method for using a pixel shader module for performing color space processing on sets of color coefficients respectively associated with pixels of a video image, the sets of color coefficients being in a first multi-dimensional color space, the method comprising:
Instructing the pixel shader module to load the set of color coefficients associated with a first pixel into first memory elements, the pixel shader module being part of a rendering stage of a 3D graphics drawing pipeline, the rendering stage being where three-dimensional graphics primitives are converted into pixels, the pixel shader module operable to receive primitive information for each one of the three-dimensional graphics primitives and to compute a color for each one of the pixels using the received primitive information and texture information received from a texture processing module which is part of the rendering stage of the 3D graphics drawing pipeline;
Instructing the pixel shader module to read the first memory elements and a plurality of second memory elements containing pre-loaded parameters representative of a color space processing function that is at least one of color space conversion and video processing amplifier control;
Instructing the pixel shader module to manipulate the first and second memory elements in accordance with the color space processing function that is at least one of color space conversion and video processing amplifier control to generate a new set of color coefficients associated with the first pixel, wherein said new set of color coefficients is in a second multi-dimensional color space that is different from the first multi-dimensional color space, wherein both the first multi-dimensional color space and said second multi-dimensional color space are of the same dimension.

19. A method as claimed in claim 18, wherein the method further comprises:
Instructing the pixel shader module to load the set of color coefficients associated with a second pixel into third memory elements;
Instructing the pixel shader module to read the third memory elements and a plurality of fourth memory elements containing pre-loaded parameters representative of a second color space processing function that is at least one of color space conversion and video processing amplifier control;
Instructing the pixel shader module to manipulate the third and fourth memory elements in accordance with the second color space processing function that is at least one of color space conversion and video processing amplifier control to generate a new set of color coefficients associated with the second pixel.

20. A method as claimed in claim 19, wherein the first and third memory elements are identical.

21. A method as claimed in claim 19, wherein the second and fourth memory elements are identical when the first and second color space processing functions are identical.

22. A method of creating a modified pixel shader program defined by a series of instructions for causing a pixel shader module to execute a pixel shading function on sets of color coefficients respectively associated with pixels of a video image, the sets of color coefficients being in a first multi-dimensional color space, the method comprising:
retaining instructions for causing the pixel shader module to load the set of color coefficients associated with each pixel into a set of first memory elements, the pixel shader module being part of a rendering stage of a 3D graphics drawing pipeline, the rendering stage being where three-dimensional graphics primitives are converted into pixels, the pixel shader module operable to receive primitive information for each one of the three-dimensional graphics primitives and to compute a color for each one of the pixels using the received primitive information and texture information received from a texture processing module which is part of the rendering stage of the 3D graphics drawing pipeline;

providing additional instructions for causing the pixel shader module to generate a processed set of color coefficients associated with each pixel by manipulating the set of first memory elements and a set of second memory elements wherein the second memory elements contain pre-loaded parameters representative of a color space processing function that is at least one of color space conversion and video processing amplifier control, wherein said processed set of color coefficients is in a second multi-dimensional color space that is different from the first multi-dimensional color space, wherein both the first multi-dimensional color space and said second multi-dimensional color space are of the same dimension.

23. A method as defined in claim 22, further comprising:
providing additional instructions for causing the pixel shader module to load the processed set of color coefficients associated with each pixel into the first memory elements.

24. A method of using a pixel shader module for performing color space processing on an original set of color coefficients in a first multi-dimensional color space, comprising:
providing a pixel shader program running on the pixel shader module with the original set of coefficients and a set of parameters representative of a color space processing function that is at least one of color space conversion and video processing amplifier control, the pixel shader module being part of a rendering stage of a 3D graphics drawing pipeline, the rendering stage being where three-dimensional graphics primitives are converted into pixels, the pixel shader module operable to receive primitive information for each one of the three-dimensional graphics primitives and to compute a color for each one of the pixels using the received primitive information and texture information received from a texture processing module which is part of the rendering stage of the 3D graphics drawing pipeline;

waiting for the pixel shader program to execute, in the pixel shader module, the desired color space processing function that is at least one of color space conversion and video processing amplifier control on the original set of color coefficients; and obtaining from the pixel shader module upon completion of the execution of the pixel shader program a processed set of color coefficients representative of the desired color space processing function that is at least one of color space conversion and video processing amplifier control having been performed on the original set of color coefficients said processed set of color coefficients is in a second multi-dimensional color space that is different from the first multi-dimensional color space, wherein both the first multi-dimensional color space and said second multi-dimensional color space are of the same dimension.

\* \* \* \* \*